Figure 3:
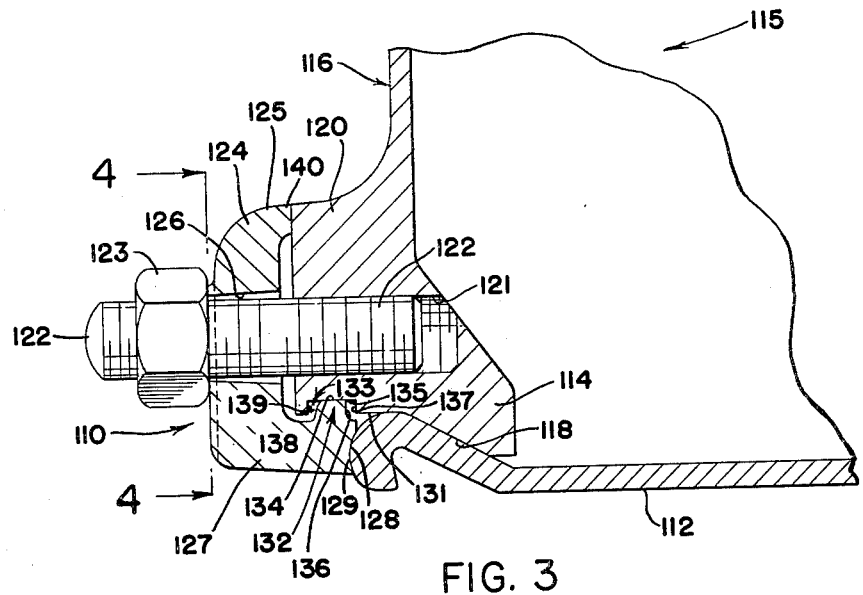

Nov. 7, 1961  G. WALTHER, SR  3,007,742
SELF-ALIGNING RIM CLAMP
Filed Nov. 10, 1959  2 Sheets-Sheet 1
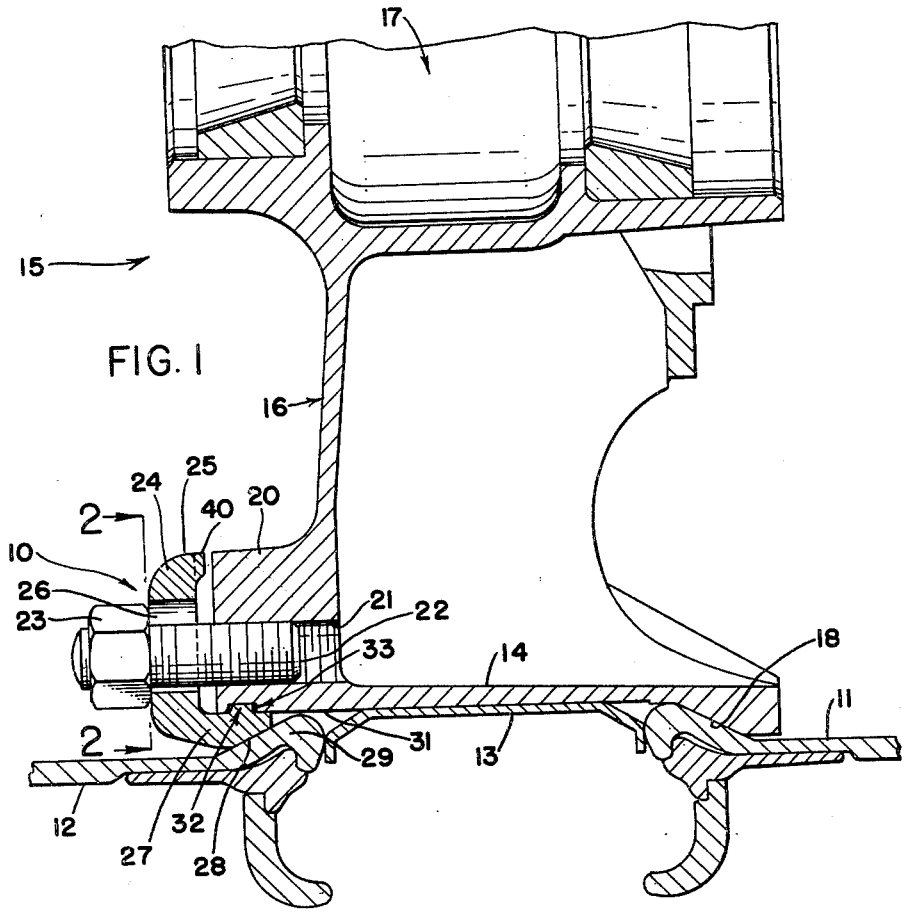
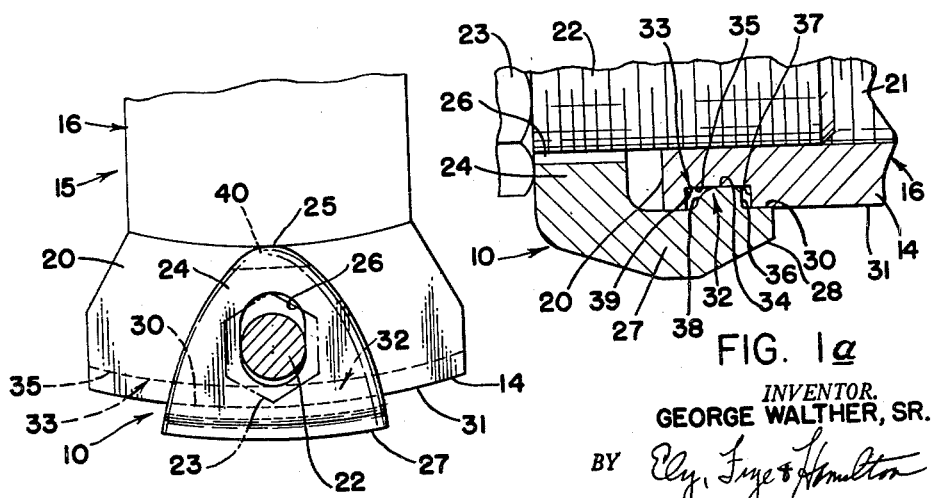
INVENTOR.
GEORGE WALTHER, SR.
BY Ely, Frye & Hamilton
ATTORNEYS Nov. 7, 1961   G. WALTHER, SR   3,007,742
SELF-ALIGNING RIM CLAMP Filed Nov. 10, 1959

INVENTOR.
GEORGE WALTHER, SR.

BY *Ely, Frye & Hamilton*

ATTORNEYS 3,007,742
Patented Nov. 7, 1961

3,007,742
SELF-ALIGNING RIM CLAMP
George Walther, Sr., Dayton, Ohio, assignor to The Dayton Steel Foundry Company, Dayton, Ohio, a corporation of Ohio
Filed Nov. 10, 1959, Ser. No. 851,982
20 Claims. (Cl. 301—20)

The present invention relates generally to clamping devices for rim and wheel assemblies. More particularly, the invention relates to an improved rim clamp whereby single or dual mounted rims, as used on vehicles such as trucks, tractors and trailers, may be demountably secured to a wheel. Specifically, the invention relates to a rim clamp which assures proper disposition of the rim or rims attached thereby with respect to the wheel on which said rim or rims are mounted.

The prior art has seen countless types and forms of single and dual rim clamps. An early type clamping device comprised a triangular shaped continuous split wedge ring which was securingly inserted between a tapered face at the outer portion of the inner diameter of the rim and a corresponding face on the outer surface of the felly or spokes. The outer surface of this ring was engaged by a series of clamping lugs which could be tightened against the ring by appropriately located nuts and bolts. This type may be seen, for example, in U.S. Patent No. 1,869,635.

Later, the use of a wedge ring per se was substantially replaced by clamping lugs with a radially outer wedging surface adapted to have sliding engagement with the flange of a wheel. This type clamping device may be seen, for example, in U.S. Patent No. 2,874,997.

However, the use of these rim clamps did not assure an exact mounting disposition of the rim with respect to the axis of rotation of the wheel on which the rim was mounted. As often occurs, a piece of foreign matter could lodge between the rim and mounting surface of the wheel, and the rim would be secured with a cant from true perpendicular with respect to the rotational axis of the wheel. Or, if the mechanic mounting the rims on the wheel overly tightened the nut securing one lug before tightening the others, a similar angular mounting could result. Such improper mounting could easily escape the eye of the observer as the vehicle stood at rest. However, in travel, a rim so mounted would wobble—the plane in which said tire is positioned not being perpendicular to the rotational axis of the wheel.

Such a wobble could cause the tire to unevenly contact the road surface, resulting in excessive wear to the tire and creating high subjectivity to tire failure and its attendant burdens of higher operational cost and greater risk of accident. At the same time, the wobble would induce a vibration which, at certain speeds, would set up harmonic vibrations which could seriously impair the operation of the steering mechanism or cause structural failure of the vehicle itself.

Therefore, it is an object of the present invention to provide an improved clamp for mounting a single rim whereby the rim can only be secured and maintained in perpendicular relationship to the rotational axis of the wheel on which the rim is mounted.

It is a further object to provide an improved clamp for use with dual mounted rims which assures that the planes in which the rims lie are in parallel disposition to each other and are perpendicular to the axis of rotation of the wheel on which said rims are mounted.

It is a still further object to provide such a self-aligning rim clamp which permits ease of assembly and disassembly.

It is also an object to provide such a self-aligning rim clamp which is adapted for use with a wheel having an integrated felly or a wheel with a hub and spokes having free ends with interrupted surfaces.

These and other objects of the invention, as well as the advantages thereof, will be apparent in view of the following detailed description and the attached drawings.

Figure 4:
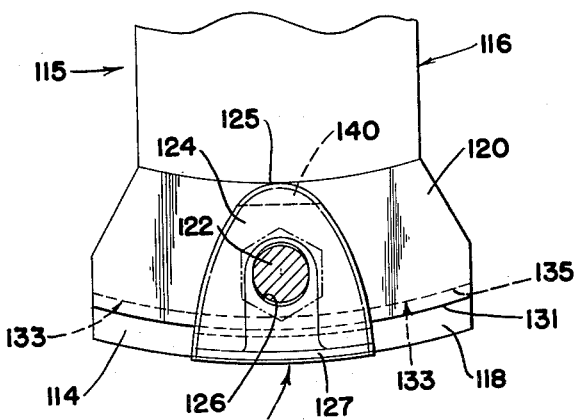

In the drawings:
FIG. 1 is a fragmentary section showing a rim clamp according to the invention as used with a dual rim wheel assembly;
FIG. 1a is an enlarged view of a portion of FIG. 1 showing in detail the relation of a rim clamp to the wheel and an outer rim;
FIG. 2 is an elevation taken substantially as indicated on line 2—2 of FIG. 1;
FIG. 3 is a fragmentary section showing a rim clamp according to the invention as used with a single rim wheel assembly; and
FIG. 4 is an elevation taken substantially as indicated on line 4—4 of FIG. 3.

A rim clamp according to the invention is generally L shaped in cross section, having an upright leg or bolt supported portion extending inward along the radially outer face of a wheel, and a horizontal leg or lateral portion extending inward along the axially outer surface of a wheel. The rim clamp is characterized by a specially adapted boss or surface on the inner face of the bolt supported portion, to prevent "cocking" of the clamp in the operative condition as described in detail below.

The clamp is further characterized in that the inner surface of the laterally extending or horizontal leg portion is provided with an arcuate aligning projection adapted for accommodation within a special annular groove on the radially outermost portion of the spoke end or felly surface of a wheel. The function of the rim clamp is to assure seating of either single or dual rims only perpendicularly to the rotational axis of the wheel.

Referring to FIGS. 1–2, the form of rim clamp according to the invention intended for use with a dual rim wheel assembly is indicated generally by the numeral 10. A conventional inner rim 11 and an interchangeable outer rim 12, separated by a suitable spacer ring 13, are mounted on the felly surface 14 of a conventional wheel 15. The wheel 15 may have any desired number of spokes 16 extending radially of the hub area 17. The inner rim 11 is wedgingly seated on a standard (e.g. 28°) radially beveled rim mounting surface 18 on the axially inner portion of the felly surface 14.

A wheel 15 is further provided with a plurality of bosses 20, shown as the radially outer terminal portions of the spokes 16, having threaded bores 21 for attaching of the rim clamps 10, as by stud bolts 22 and nuts 23.

The radially oriented upright leg or bolt-supported portion 24 of a clamp 10 is substantially parabolic in shape when viewed as in FIG. 2. The vertex 25 of this portion is directed radially inwardly when the clamp is in operative position on the wheel 15. This portion of the clamp also has a radially elongated slot 26, for purposes described below.

The axially oriented horizontal leg or lateral portion 27 of a clamp 10 has an outward conical surface 28, including a standard (e.g. 28°) beveled surface for wedging engagement with the inclined mounting flange 29 of an outer rim 12. The inner face 30 of clamp portion 27 conforms with the radially outer surface of the felly 14 for sliding engagement therewith and is provided with an arcuate aligning projection 32 adapted for insertion within a substantially rectangular in cross section, annular, aligning groove 33 located adjacent the axially outer edge of the surface 31 of the felly 14.

As best shown in FIG. 1a, the radially inner portion 34 of a clamp projection 32 conforms in shape with the base portion 35 of the aligning groove 33. The surface of portion 34 is thus cylindrical and defines a functional profile which permits sliding engagement with the groove base portion 35. The axially inner portion 36 of a clamp projection 32 conforms in shape with the axially inner portion 37 of the aligning groove 33. The surface of portion 36 defines a stop shoulder to abut the groove portion 37 when the clamp is in operative position on a wheel and prevents overtightening of the rims and spacer assembly.

The axially outer or outward facing portion 38 of a clamp projection 32 is arcuately rounded to provide for insertion of the clamp projection into the wheel groove 33. As shown in FIG. 1, the inner rim 11, the spacer 13, and the outer rim 12 are mounted on the wheel, the inner rim mounting flange being seated on the wheel surface 18. The clamp 10 may be attached to the wheel and the clamp surface 28 may be brought into wedging engagement with the outer rim mounting flange because the axial profile of the projection 32 is such that the projection will slide axially inward past the intersection of the surface 31 of the felly and the axially outer portion 39 of the aligning groove 33.

The elongated slot 26, described above, facilitates the rim positioning movement of a clamp 10. As the clamp 10 slides along the inclined mounting flange 29 of surface 28, it is moving radially inwardly as well as axially inwardly. The radially inward component of the movement of clamp 10 around axially protruding fixed stud bolt 22 is only made possible by the use of slot 26.

On the vertex portion 25 of the clamp 10, a shoulder 40 extends axially inward and provides a further restriction on the radial force transmitted to rim 12 upon tightening the clamp 10 into operative position. When tightening of nut 23 brings the shoulder 40 into contact with the axially outer surface of boss 20 and the stop shoulder surface 36 on projection 32 into contact with surface 37 of groove 33, two distinct movements of clamp 10 are prevented. The clamp 10 is prevented from further axially inward movement and is also prevented from "cocking," that is, a dextrorotation of the clamp which would cause mounting surface 28 to move radially against flange 29 of rim 12. The abutting of shoulder 40 against boss 20 is termed "heeling" and is most advantageous to prevent unwanted radial rim stresses and the possibly resulting rim deformation.

Referring to FIGS. 3 and 4, the form of rim clamp according to the invention intended for use with a single rim assembly is indicated generally by the numeral 110. The single rim 112 is carried radially of the felly surface 114 of a conventional wheel 115 and is seated on a standard (e.g. 28°) radially beveled rim mounting surface 118. The spoke ends 116 of a wheel 115 terminate in bosses 120 having threaded bores 121 for attaching of the rim clamps 110, as by stud bolts 122 and nuts 123.

The radially oriented upright leg or bolt-supported portion 124 of clamp 110 is substantially parabolic in shape when viewed as in FIG. 4. The vertex portion 125 is directed radially inwardly of the wheel 115. The middle area of clamp portion 124 has a cylindrical slot 126, preferably having slightly tapered sides to facilitate positioning of the clamp over a stud bolt 122.

The axially oriented horizontal leg or lateral portion 127 of a clamp 110 does not have a standard beveled surface of the same configuration of surface 28 of a clamp 10; rather, there is provided on the axially inner end of portion 127 a concave surface 128 conforming with the convex axially outer edge 129 of the bead flange of a rim 112. When the clamp 110 is positioned and tightened as shown, the rim 112 is seated on the felly surface 118 by the wedging engagement of surface 128 against the rim edge 129.

The inner face of clamp portion 127 conforms with the radially outer surface 131 of the felly 114 and is provided with an arcuate aligning projection 132, of the same functional profile as projection 32 of a clamp 10, adapted for insertion, within an aligning groove 133, similar to the groove 33 in a wheel 15, located adjacent the axially outer edge of the surface 131 of the felly 114.

The projection 132 has a radially inner portion 134 conforming with the base portion 135 of aligning groove 133; an axially inner stop shoulder portion 136 which will abut the axially inner groove portion 137 when the clamp is tightened; and, an arcuately rounded axially outer portion 138 so that the clamp 110 will slide axially inwardly past the intersection of the surface 131 of the felly and the axially outer portion 139 of the groove 133.

The vertex portion 125 of the upright leg of the clamp is preferably provided with a shoulder 140 extending axially inward to function in a manner like the shoulder 40 of a clamp 10.

From the above description, it will be apparent that the clamps 10 or 110 are so conceived as to provide for positive alignment of dual or single rims on a wheel. If excessive foreign matter were to lodge between the component parts of a wheel assembly; e.g., between the felly surface 14 and an inner rim 11, or between a rim 11 and a spacer 13, or between a spacer 13 and an outer rim 12, or between a rim flange 29 and a clamp, or between a wheel surface 118 and a rim 112, or between a rim edge 129 and the clamp 110, in each event the clamps 10 or 110 could not be tightened and would immediately reveal the non-aligned attitude of the rims because the projections 32 or 132 could not position within the wheel grooves 33 or 133. Thus, the rim clamps according to the invention will signal or indicate misalignment of rims irrespective of cause.

Therefore the present invention affords an easy means for assembling and disassembling single or dual rim wheel assemblies, assures that the mounted rim or rims assume a properly aligned position on the wheel, and provides clamps that can be securely tightened only when the rims are properly seated.

What is claimed is:

1. In combination, a wheel having a felly for mounting a rim and positioning a plurality of rim clamps, a rim mounted on said felly, the axially outer edge of said rim terminating in a convex surface, a substantially rectangular groove on the axially outer surface of said felly, said clamp comprising a radially oriented leg, a tapered bore through said leg, tightening means interconnecting said radial leg with said wheel through said bore, a shoulder depending axially inward from the radially inner portion of said radial leg which contacts said wheel and provides the pivot about which said clamping device rocks when tightened into operative position, an axially oriented leg depending axially inward from the radially outer portion of said radial leg, a concave surface defining the axially inner end of said axial leg for engaging the convex surface on said rim, a cylindrical surface defining the radially inner portion of said axial leg and a projection protruding from said cylindrical surface, said projection being defined by an axially inner surface substantially normal to said cylindrical surface which abuts the axially inner surface of said groove to prevent overly tightening said clamp, a radially inner surface concentric with said cylindrical surface adapted for slidably engaging the radially inner surface of said groove, and an arcuate surface between said cylindrical surface and said radially inner surface to permit ease of positioning said projection within said groove when the rims are perpendicularly aligned with the rotational axis of said wheel.

2. An article of manufacture for clamping a rim on a wheel, comprising, a bolt-supported portion and an angularly extending rim engaging and positioning flange, said flange having a rim engaging surface on the end thereof and an arcuate projection on the inner face thereof, said projection having a shoulder stop for the surface away from said bolt-supported portion and a rounded surface toward said bolt-supported portion.

3. An article of manufacture for clamping a rim on a wheel, comprising, a bolt-supported portion and an angularly extending rim engaging and positioning flange, said bolt-supported portion having a slot therethrough elongated perpendicularly to said flange, said flange having a rim engaging surface on the end thereof and an arcuate projection on the inner face thereof, said projection having a shoulder stop for the surface away from said bolt-supported portion and a rounded surface toward said bolt-supported portion.

4. An L-shaped article of manufacture for clamping a rim on a wheel, comprising, an elongated bolt-supported leg and an intersecting shorter leg, said shorter leg having a conical rim engaging surface on the outer face thereof and an arcuate projection on the inner face thereof, said projection having a shoulder stop for the surface away from said bolt-supported leg and a rounded surface toward said bolt-supported leg.

5. An L-shaped article of manufacture for clamping a rim on a wheel, comprising, an elongated bolt-supported leg and an intersecting shorter leg, said bolt-supported leg having a slot therethrough elongated perpendicularly to said shorter leg, said shorter leg having a conical rim engaging surface on the outer face thereof and an arcuate projection on the inner face thereof, said projection having a shoulder stop for the surface away from said bolt-supported leg and a rounded surface toward said bolt-supported leg.

6. An L-shaped article of manufacture for clamping a rim on a wheel, comprising, an elongated bolt-supported leg and an intersecting shorter leg, said bolt-supported leg having a slot therethrough elongated perpendicularly to said shorter leg, and a stop surface on the inner face of said bolt-supported leg, said shorter leg having a conical rim engaging surface on the outer face thereof and an arcuate projection on the inner face thereof, said projection having a shoulder stop for the surface away from said bolt-supported leg and a rounded surface toward said bolt-supported leg.

7. An article of manufacture for clamping a rim on a wheel, comprising, a radially inwardly disposed bolt-supported portion and a laterally extending rim engaging and positioning portion, said laterally extending portion having a conical rim engaging surface on the radially outer face thereof and an arcuate projection on the inner face thereof, said projection having a shoulder stop for the surface laterally furtherest from said bolt-supported portion and a rounded surface laterally closest to said bolt-supported portion.

8. An article of manufacture for clamping a rim on a wheel, comprising, a radially inwardly disposed bolt-supported portion and a laterally extending rim engaging and positioning portion, said bolt-supported portion having a slot therethrough elongated perpendicularly to said laterally extending portion; said laterally extending portion having a conical rim engaging surface on the radially outer face thereof and an arcuate projection on the inner face thereof, said projection having a shoulder stop for the surface laterally furtherest from said bolt-supported portion and a rounded surface laterally closest to said bolt-supported portion.

9. An article of manufacture for clamping a rim on a wheel, comprising, a radially inwardly disposed bolt-supported portion and a laterally extending rim engaging and positioning portion, said bolt-supported portion having a slot therethrough elongated perpendicularly to said laterally extending portion, and a stop surface laterally inward of said bolt-supported portion, said laterally extending portion having a conical rim engaging surface on the radially outer face thereof and an arcuate projection on the inner face thereof, said projection having a shoulder stop for the surface laterally furtherest from said bolt-supported portion and a rounded surface laterally closest to said bolt-supported portion.

10. An article of manufacture for clamping a rim on a wheel, comprising, a bolt-supported portion and an angularly extending rim engaging and positioning flange, said flange having a convex surface on the end thereof away from said bolt-supported portion and an arcuate projection on the inner face thereof, said projection having a shoulder stop for the surface away from said bolt-supported portion and a rounded surface toward said bolt-supported portion.

11. An article of manufacture for clamping a rim on a wheel, comprising, a bolt-supported portion and an angularly extending rim engaging and positioning flange, said bolt-supported portion having a tapered bore therethrough, said flange having a convex surface on the end thereof away from said bolt-supported portion and an arcuate projection on the inner face thereof, said projection having a shoulder stop for the surface away from said bolt-supported portion and a rounded surface toward said bolt-supported portion.

12. An article of manufacture for clamping a rim on a wheel, comprising, a bolt-supported portion and an angularly extending rim engaging and positioning flange, said bolt-supported portion having a tapered bore therethrough, and a stop surface on the inner face of said bolt-supported portion, said flange having a convex surface on the end thereof away from said bolt-supported portion and an arcuate projection on the inner face thereof, said projection having a shoulder stop for the surface away from said bolt-supported portion and a rounded surface toward said bolt-supported portion.

13. A wheel and rim assembly comprising, a wheel having a felly, a surface on said felly for seating a rim, and an annular groove in said felly located axially outward of said surface, a rim seated on said surface, and a plurality of clamps fastened by bolts circumferentially spaced axially outwardly on said wheel, a clamp having a bolt supported portion and a rim engaging portion extending laterally therefrom, said rim engaging portion having a radially inner felly engaging face, a rim aligning projection extending radially inwardly from the radially inner felly engaging face, said projection received within said annular groove when a rim is properly seated on said felly surface.

14. A wheel and rim assembly comprising, a wheel having a felly, a surface on said felly for seating a rim and an annular groove in said felly being substantially rectangular in cross-section and located axially outward of said surface, a rim seated on said surface, and a plurality of clamps fastened by bolts circumferentially spaced axially outwardly on said wheel, a clamp having a bolt supported portion and a rim engaging portion extending laterally therefrom, said rim engaging portion having a radially inner felly engaging face, a rim aligning projection extending radially inwardly from the radially inner felly engaging face, said projection received within said annular groove when a rim is properly seated on said felly surface.

15. A wheel and rim assembly, comprising, a wheel having a felly, a surface on said felly for seating a rim, and an annular groove in said felly located axially outward of said surface, a rim seated on said surface and a plurality of clamps fastened by bolts circumferentially spaced axially outwardly on said wheel, a clamp having a bolt supported portion and a rim engaging portion extending laterally therefrom, said rim engaging portion having a radially inner felly engaging face, a rim aligning projection extending radially inwardly from the radially inner felly engaging face, said projection having an axially outer arcuate surface and a functional profile so that the projection is received within said rectangular groove only when a rim is properly seated on said felly surface.

16. In combination, a wheel having a felly for mounting dual rims and positioning a clamping device, said felly having a medial rim carrying surface and a substantially rectangular axially outer groove, said clamping device comprising an upright leg radially oriented to said wheel, tightening means interconnecting said upright leg to said wheel, a base leg axially oriented to said wheel, said base leg having a radially outer conical surface and a radially inner cylindrical surface, and a projection protruding from said cylindrical surface for positioning within said groove.

17. In combination, a wheel having a felly for mounting dual rims and positioning a plurality of clamping devices, said felly having an axially inner rim mounting surface and a substantially rectangular axially outer positioning groove, dual interchangeable rims, said rims having mounting flanges, and a spacer band to separate said rim; said clamping device comprising, an upright leg radially oriented to said wheel, tightening means interconnecting said upright leg to said wheel, a base leg axially oriented to said wheel, said base leg having a radially outer conical surface for wedgingly engaging a mounting flange on one of said rims and a radially inner cylindrical surface adapted for slidingly engaging said felly, a projection protruding radially inwardly of said cylindrical surface and having an axially outward facing arcuately rounded surface, said rims perpendicularly aligned to the rotational axis of said wheel when said projection is positioned within said groove.

18. In combination, a wheel having a felly for mounting dual rims and positioning a plurality of clamping devices, inner and outer rims mounted on said felly, a substantially rectangular groove on the axially outer surface of said felly having a radially extending axially inner surface and an arcuate radially inner surface, said clamping device comprising, a radially oriented leg, a radially elongated slot through said radial leg, tightening means interconnecting said radial leg with said wheel through said slot, a shoulder depending axially inward from the radially inner portion of said radial leg to prevent overly tightening said clamp, an axially oriented leg, said legs joined at their bases substantially perpendicular to each other, said axially oriented leg having a radially outer conical surface for wedgingly engaging the outer rim and a radially inner cylindrical surface adapted for slidably engaging said felly, and a projection protruding from said cylindrical surface, said projection being defined by an axially inner surface substantially normal to said cylindrical surface which abuts the axially inner surface of said groove to prevent overly tightening said clamp, a radially inner surface concentric with said cylindrical surface adapted for slidably engaging the radially inner surface of said groove, and an arcuately rounded surface between said cylindrical surface and said radially inner surface to permit ease of positioning said projection within said groove when the rims are perpendicularly aligned with the rotational axis of said wheel.

19. In combination, a wheel having a felly for mounting a rim and positioning a plurality of rim clamps, said felly having a rim mounting surface and a substantially rectangular axially outer groove, a rim mounted on said felly, said clamp comprising, an upright leg radially oriented to said wheel, tightening means interconnecting said upright leg to said wheel, a base leg axially oriented to said wheel, said base leg having an axially inner end shaped to complementarily engage the axially outer edge of said rim, said base leg having a radially inner cylindrical surface and a projection protruding from said cylindrical surface for positioning within said groove.

20. In combination, a wheel having a felly for mounting a rim and positioning a plurality of rim clamps, a rim mounted on said felly, said rim having a shaped clamping surface, a substantially rectangular groove on the axially outer surface of said felly having a radially extending axially inner surface and an arcuate radially inner surface, said clamp comprising a radially oriented leg, a tapered bore through said leg, tightening means interconnecting said radial leg with said wheel through said bore, said radial leg having a radially inward axially inwardly extending shoulder which contacts said wheel and provides the pivot about which said clamping device rocks when tightening into operative position, an axially oriented leg depending axially inward from said radial leg and having a complementarily shaped axially inner surface for engaging the shaped clamping surface on said rim, said axial leg having a radially inner cylindrical felly engaging surface and a projection protruding from said cylindrical surface, said projection defined by an axially inner surface substantially normal to said cylindrical surface which abuts the axially inner surface of said groove to prevent overly tightening said clamp, a radially inner surface concentric with said cylindrical surface adapted for slidably engaging the radially inner surface of said groove, and an arcuate surface between said cylindrical surface and said radially inner surface to permit ease of positioning said projection within said groove when the rims are perpendicularly aligned with the rotational axis of said wheel.

References Cited in the file of this patent

UNITED STATES PATENTS

| | | |
|---|---|---|
| 1,292,639 | Perlman | Jan. 28, 1919 |
| 1,679,454 | Wagenhorst | Aug. 7, 1928 |
| 2,261,637 | Ash | Nov. 4, 1941 |